United States Patent
Johnson

(10) Patent No.: US 11,799,116 B2
(45) Date of Patent: Oct. 24, 2023

(54) JOHNSON THERMO-ELECTROCHEMICAL CONVERTER

(71) Applicant: JTEC ENERGY, INC., Atlanta, GA (US)

(72) Inventor: Lonnie G. Johnson, Atlanta, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 0 days.

(21) Appl. No.: 17/584,915

(22) Filed: Jan. 26, 2022

(65) Prior Publication Data

US 2022/0149414 A1 May 12, 2022

Related U.S. Application Data

(62) Division of application No. 16/333,801, filed as application No. PCT/US2017/052191 on Sep. 19, 2017, now Pat. No. 11,271,236.

(Continued)

(51) Int. Cl.
*H01M 8/18* (2006.01)
*F25B 23/00* (2006.01)
(Continued)

(52) U.S. Cl.
CPC ............. *H01M 8/182* (2013.01); *F25B 23/00* (2013.01); *H01M 8/04067* (2013.01);
(Continued)

(58) Field of Classification Search
CPC ............. H01M 8/182; H01M 8/04067; H01M 8/04925; H01M 8/2465; H01M 8/04029; H01M 8/04007; F25B 23/00
See application file for complete search history.

(56) References Cited

U.S. PATENT DOCUMENTS

| 4,927,793 A | 5/1990 | Hori et al. |
| 7,160,639 B2 | 1/2007 | Johnson et al. |

(Continued)

FOREIGN PATENT DOCUMENTS

| WO | 2015044435 A1 | 4/2015 |
| WO | 2016025372 A1 | 2/2016 |
| WO | 2016145043 A1 | 9/2016 |

OTHER PUBLICATIONS

Office Action dated Jun. 28, 2022 in CN Application No. 201780057743. 4.

(Continued)

*Primary Examiner* — Niki Bakhtiari
*Assistant Examiner* — Adam J Francis
(74) *Attorney, Agent, or Firm* — Panitch Schwarze Belisario & Nadel LLP

(57) ABSTRACT

A electrochemical direct heat to electricity converter having a low temperature membrane electrode assembly array and a high temperature membrane electrode assembly array is provided. Additional cells are provided in the low temperature membrane electrode assembly array, which causes an additional amount of the working fluid, namely hydrogen, to be pumped to the high pressure side of the converter. The additional pumped hydrogen compensates for the molecular hydrogen diffusion that occurs through the membranes of the membrane electrode assembly arrays. The MEA cells may be actuated independently by a controller to compensate for hydrogen diffusion.

6 Claims, 5 Drawing Sheets

Related U.S. Application Data

(60) Provisional application No. 62/396,463, filed on Sep. 19, 2016.

(51) Int. Cl.
    *H01M 8/04007*     (2016.01)
    *H01M 8/2465*      (2016.01)
    *H01M 14/00*       (2006.01)

(52) U.S. Cl.
    CPC ......... *H01M 8/2465* (2013.01); *H01M 14/00* (2013.01); *Y02E 60/50* (2013.01)

(56) References Cited

U.S. PATENT DOCUMENTS

| | | | | |
|---|---|---|---|---|
| 7,943,250 | B1* | 5/2011 | Johnson | H01M 8/04089 |
| | | | | 205/345 |
| 2003/0203276 | A1* | 10/2003 | Johnson | F25B 23/00 |
| | | | | 429/50 |
| 2012/0064419 | A1* | 3/2012 | Johnson | H01M 8/04955 |
| | | | | 429/408 |
| 2014/0328727 | A1* | 11/2014 | Johnson | H01M 8/065 |
| | | | | 422/186.04 |

OTHER PUBLICATIONS

Gellender, M., "A proposed new energy source: The "mixing energy" of engine exhaust gas," Journal of Renewable and Sustainable Energy, vol. 2, pp. 023101-1-023101-14 (2010).

International Preliminary Report on Patentability dated Mar. 19, 2019 In International Application No. PCT/US2017/052191; dated Mar. 28, 2019.

International Search Report and Written Opinion dated Nov. 3, 2017 in International Application No. PCT/US2017/052191.

Joshi, Dr. Ashok V., "Thermoelectric Conversion with Ion Conductors," Final Report, Contract #N00014-86-C-0827, 40 pages (Jan. 1990).

Office Action dated Jun. 8, 2020 in JP Application No. 2019515346.

Office Action dated Sep. 9, 2021 in CN Application No. 201780057743.4.

Virkar et al., "Theoretical Assessment of an Oxygen Heat Engine: The Effect of Mass Transport Limitation," Energy Convers. Mgmt., vol. 32, No. 4, pp. 359-370 (1991).

* cited by examiner

JOHNSON THERMO-ELECTROCHEMICAL CONVERTER

CROSS-REFERENCE TO RELATED APPLICATIONS

This application is a Divisional of U.S. patent application Ser. No. 16/333,801, filed on Mar. 15, 2019 and allowed on Nov. 23, 2021, which is a Section 371 of International Application No. PCT/US2017/052191, filed Sep. 19, 2017, which was published in the English language on Mar. 22, 2018, under International Publication No. WO 2018/053474 A1, which claims priority to U.S. Provisional Application No. 62/396,463 filed on Sep. 19, 2016, the disclosures of each of which are incorporated herein by reference in their entireties.

BACKGROUND OF THE INVENTION

The conversion of heat energy or chemical energy to electrical energy, or visa-versa, may be accomplished in a variety of ways. For example, known electrochemical cells or batteries rely on chemical reactions wherein ions and electrons of a reactant being oxidized are transferred to the reactant being reduced via separate paths. Specifically, the electrons are transferred electrically via wiring through an external load where they perform work and the ions are conducted through an electrolyte separator.

However, battery type electrochemical cells can produce only a limited amount of energy because the confines of the battery casing limit the amount of available reactants that may be contained therein. Although such cells can be designed to be recharged by applying a reverse polarity current/voltage across the electrodes, such recharging requires a separate electrical source. Also, during the recharging process, the cell is typically not usable.

Fuel cells have been developed in an effort to overcome problems associated with battery type electrochemical cells. In conventional fuel cells, the chemical reactants are continuously supplied to and removed from the electrochemical cell. In a manner similar to batteries, fuel cells operate by conducting an ionized species through a selective electrolyte which generally blocks passage of electrons and non-ionized species.

The most common type of fuel cell is a hydrogen-oxygen fuel cell which passes hydrogen through one of the electrodes and oxygen through the other electrode. The hydrogen ions are conducted through the electrolyte separator to the oxygen side of the cell under the chemical reaction potential of the hydrogen and oxygen. Porous electrodes on either side of the electrolyte separator are used to couple the electrons involved in the chemical reaction to an external load via an external circuit. The electrons and hydrogen ions reconstitute hydrogen and complete the reaction, while the oxygen on the oxygen side of the cell results in the production of water which is expelled from the system. A continuous electrical current is maintained by a continuous supply of hydrogen and oxygen to the cell.

Mechanical heat engines have also been designed and used to produce electrical power. Such mechanical heat engines operate on thermodynamic cycles wherein shaft work is performed using a piston or turbine to compress a working fluid. The compression process is performed at a low temperature and, after compression, the working fluid is raised to a higher temperature. At the high temperature, the working fluid is allowed to expand against a load, such as a piston or turbine, thereby producing shaft work. A key to the operation of all engines employing a working fluid is that less work is required to compress the working fluid at low temperatures than that produced by expanding it at high temperatures. This is the case for all thermodynamic engines employing a working fluid.

For example, steam engines operate on the Rankine thermodynamic cycle, wherein water is pumped to a high pressure, and then heated to steam and expanded through a piston or turbine to perform work. Internal combustion engines operate on the Otto cycle, wherein low-temperature ambient air is compressed by a piston and then heated to very high temperatures via fuel combustion inside the cylinder. As the cycle continues, the expansion of the heated air against the piston produces more work than that consumed during the lower temperature compression process.

The Stirling engine has been developed to operate on the Stirling cycle in an effort to provide an engine that has high efficiency and offers greater versatility in the selection of the heat source. The ideal Stirling thermodynamic cycle is of equivalent efficiency to the ideal Carnot cycle, which defines the theoretical maximum efficiency of an engine operating on heat input at high temperatures and heat rejection at low temperatures. However, as with all mechanical engines, the Stirling engine suffers from reliability problems and efficiency losses associated with its mechanical moving parts.

In an effort to avoid the problems inherent with mechanical heat engines, Alkali Metal Thermo-Electrochemical Conversion (AMTEC) cells have been designed as a thermo-electrochemical heat engine. AMTEC heat engines utilize pressure to generate a voltage potential and electrical current by forcing an ionizable working fluid, such as sodium, through an electrochemical cell at high temperatures. The electrodes couple the electrical current to an external load. Electrical work is performed as the pressure differential across the electrolyte separator forces molten sodium atoms through the electrolyte. The sodium is ionized upon entering the electrolyte, thereby releasing electrons to the external circuit. On the other side of the electrolyte, the sodium ions recombine with the electrons to reconstitute sodium upon leaving the electrolyte, in much the same way as the process that occurs in battery and fuel cell type electrochemical cells. The reconstituted sodium, which is at a low pressure and a high temperature, leaves the electrochemical cell as an expanded gas. The gas is then cooled and condensed back to a liquid state. The resulting low-temperature liquid is then re-pressurized. Operation of an AMTEC engine approximates the Rankine thermodynamic cycle.

Numerous publications are available on AMTEC technology. See, for example, *Conceptual design of AMTEC demonstrative system for 100 t/d garbage disposal power generating facility*, Qiuya Ni et al. (Chinese Academy of Sciences, Inst. of Electrical Engineering, Beijing, China). Another representative publication is Intersociety Energy Conversion Engineering Conference and Exhibit (IECEC), 35th, Las Vegas, Nev. (Jul. 24-28, 2000), Collection of Technical Papers. Vol. 2 (A00-37701 10-44). Also see American Institute of Aeronautics and Astronautics, 190, p. 1295-1299. REPORT NUMBER(S)—AIAA Paper 2000-3032.

AMTEC heat engines suffer from reliability issues due to the highly corrosive nature of the alkali metal working fluid. AMTEC engines also have very limited utility. Specifically, AMTEC engines can only be operated at very high temperatures because ionic conductive solid electrolytes achieve practical conductivity levels only at high temperatures. Indeed, even the low-temperature pressurization process must occur at a relatively high temperature, because the alkali metal working fluid must remain above its melt temperature at all times as it moves through the cycle. Mechanical pumps and even magneto-hydrodynamic pumps have been used to pressurize the low-temperature working fluid.

In an effort to overcome the above-described drawbacks of conventional mechanical and thermo-electrochemical heat engines, the Johnson Thermo-Electrochemical Converter (JTEC) system was developed, as disclosed in U.S. Pat. No. 7,160,639 filed Apr. 28, 2003, International Patent Application No. PCT/US2015/044435 filed Aug. 10, 2015, and International Patent Application No. PCT/US2016/21508 filed Mar. 9, 2016, the entire contents of all three documents being incorporated herein by reference.

The present invention provides an improvement over a typical JTEC system. More particularly, the present invention provides a solid state heat engine that compensates for pressure loss due to the diffusion of molecular hydrogen.

BRIEF SUMMARY OF THE INVENTION

One embodiment of the present invention relates to a electrochemical direct heat to electricity converter having a low temperature membrane electrode assembly array and a high temperature membrane electrode assembly array. Additional cells are provided in the low temperature membrane electrode assembly array as compared to the high temperature membrane electrode assembly array, which causes additional working fluid, namely hydrogen, to be pumped to the high pressure side of the converter. The additional pumped hydrogen compensates for the molecular hydrogen diffusion that occurs through the membranes of the membrane electrode assembly arrays. In one embodiment, the MEA cells may be actuated independently by a controller to compensate for hydrogen diffusion.

BRIEF DESCRIPTION OF THE SEVERAL VIEWS OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings.

DETAILED DESCRIPTION OF THE INVENTION

Figure 1:
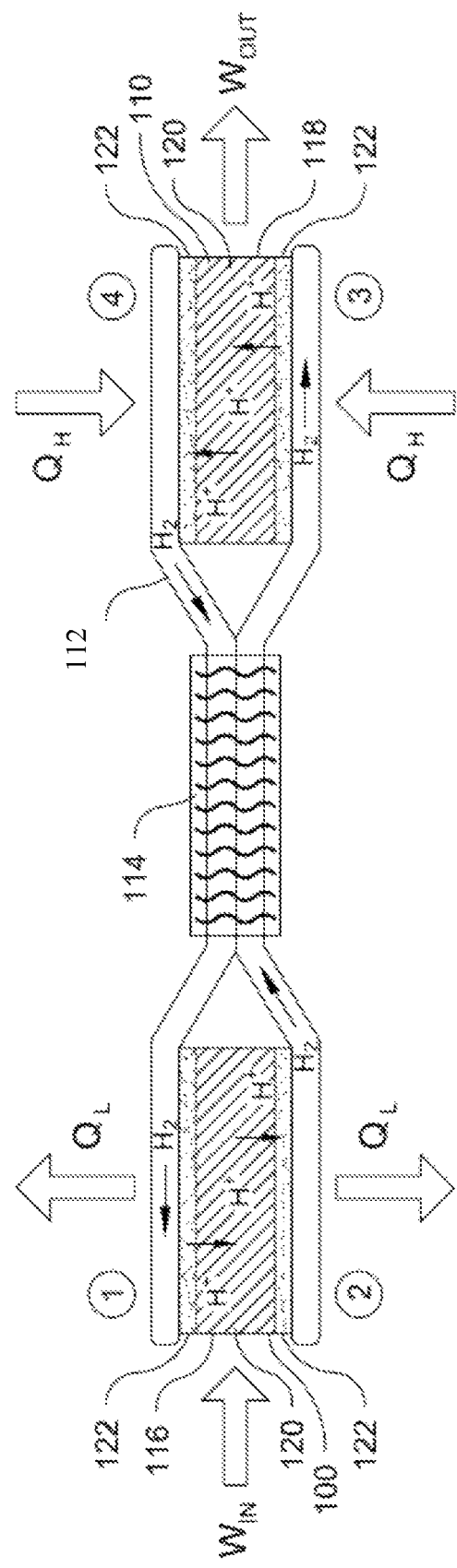
FIG. 1 is a diagram of a Johnson Thermo-Electrochemical Converter including two membrane electrode assemblies connected back to back by a recuperative heat exchanger.

Certain terminology is used in the following description for convenience only and is not limiting. The words "proximal," "distal," "upward," "downward," "bottom" and "top" designate directions in the drawings to which reference is made. The words "inwardly" and "outwardly" refer to directions toward and away from, respectively, a geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

It will also be understood that terms such as "first," "second," and the like are provided only for purposes of clarity. The elements or components identified by these terms, and the operations thereof, may easily be switched. Also, the phrases "plurality of MEAs", "MEA cell array" and "MEA cell stack" may be used interchangeably herein.

Referring to FIG. 1, there is shown a typical JTEC system (electrical connections not shown). JTEC is a heat engine that includes a first electrochemical cell 100 operating at a relatively low temperature, a second electrochemical cell 110 operating at a relatively high temperature, a conduit system 112 including a heat exchanger 114 that couples the two cells together, and a supply of ionizable gas (such as hydrogen, oxygen or sodium) as a working fluid contained within the conduit system. Preferably, the working fluid is hydrogen. Each electrochemical cell includes a Membrane Electrode Assembly (MEA).

More particularly, the JTEC heat engine includes a first MEA 118 coupled to a high temperature heat source $Q_H$ (i.e., a high temperature MEA), a second MEA 116 coupled to a low temperature heat sink $Q_L$ (i.e., a low temperature MEA), and a recuperative heat exchanger 114 connecting the two MEAs 116, 118. Each MEA 116, 118 includes a non-porous membrane 120 capable of conducting ions of the working fluid and porous electrodes 122 positioned on opposite sides of the non-porous membrane 120 that are capable of conducting electrons.

Preferably, on both the high temperature and low temperature sides, overlapping layers of alternating electrodes 122 and membranes 120 arranged in a stacked configuration. That is, each membrane 120 is sandwiched between a pair of electrodes 122, such that the electrodes 122 are stacked in alternating sequence with the membranes 120, thus forming MEA stacks through which a working fluid, preferably hydrogen, can pass by undergoing an electrochemical oxidation/reduction process.

The membranes 120 are preferably ion conductive membranes or proton conductive membranes having a thickness on the order of approximately 0.1 μm to 500 μm, and more preferably between approximately 1 μm and 500 μm. More particularly, the membranes 120 are preferably made from a proton conductive material, and more preferably a polymer proton conductive material or a ceramic proton conductive material. In one embodiment, the membranes 120 are preferably formed of a material comprising a compound represented by the general formula $Na_xAl_yTi^{3+}_{x-y}Ti^{4+}_{8-x}O_{16}$, as disclosed in U.S. Pat. No. 4,927,793 of Hori et al., which is incorporated herein by reference, since this material exhibits high proton conductivity over a broad temperature range. However, it will be understood by those skilled in the art that any material, and preferably any polymer or ceramic material, which demonstrates a similar proton conductivity over a broad temperature range may be used to form the membranes 120. For example, in an alternate embodiment, the membranes 120 are formed of hydronium beta" alumina.

The electrodes 122 are preferably thin electrodes having a thickness on the order of approximately 10 µm to 1 cm, and more preferably approximately 50 µm to 1,000 µm. The use of different materials for the various components (i.e., the electrodes 122 and the membranes 120) could result in very high thermal stresses due to differences in the thermal expansion coefficients between the materials. Accordingly, the electrodes 122 are preferably comprised or formed of the same material as the membranes 120. However, the electrodes 122 are preferably porous structures, while the membranes 120 are preferably non-porous structures. Also, it will be understood that the electrodes 122 and the membranes 120 may be formed of different materials having similar thermal expansion coefficients.

In one embodiment, the porous electrodes 122 may be doped or infused with additional material(s) to provide electronic conductivity and catalytic material, in order to promote oxidation and reduction of the working fluid.

On both the low temperature and high temperature sides, individual MEAs 116, 118 are preferably connected in series to form MEA stacks or arrays.

During operation of the JTEC, the working fluid passes through each MEA stack by releasing an electron to the electrode 122 on the entering side, such that the ion can be conducted through the membrane 120 to the opposite electrode 122. The working fluid is reconstituted within the opposite electrode 122 as it re-supplies electrons to working fluid ions as they exit the membrane 120. The low temperature MEA stack operates at a lower voltage than the high temperature MEA stack. The low temperature MEA stack compresses the working fluid at low voltage and the high temperature MEA stack expands hydrogen at high voltage. The difference in voltage between the two MEA stacks is applied across the external load. The hydrogen circulates continuously inside the JTEC heat engine and is never consumed. The current flow through the two MEA stacks and the external load is the same.

Specifically, in the JTEC heat engine, a hydrogen pressure differential is applied across each MEA stack with a load attached, thereby producing a voltage and current as hydrogen passes from high pressure to low pressure. The electron current is directed to the external load as electrons are stripped from the protons as they pass through the membrane 120, which is a proton conductive membrane (PCM). The JTEC system utilizes the electrochemical potential of hydrogen pressure applied across the PCM 120. More particularly, on the high pressure side of the first MEA stack (i.e., the stack of first MEAs 116) and the low pressure side of the second MEA stack (i.e, the stack of second MEAs 118), hydrogen gas is oxidized resulting in the creation of protons and electrons. The pressure differential at the high temperature end forces the protons through the membrane 120 causing the electrodes 122 to conduct electrons through an external load, while the imposition of an external voltage forces protons through the membrane at the low temperature end. On the high pressure side of the first MEA stack and the low pressure side of the second MEA stack, the protons are reduced with the electrons to reform hydrogen gas.

Unlike conventional fuel cells, in which the hydrogen exiting the MEA stack would encounter oxygen and react with it producing water, there is no oxygen or water in the JTEC system. This process can also operate in reverse. Specifically, if current is passed through the first MEA stack, a low-pressure gas can be "pumped" to a higher pressure. The reverse process is rather similar to that of using a MEA stack to electrolyze water, wherein water molecules are split and protons are conducted through the PCM, leaving oxygen behind on the water side. Hydrogen is often supplied at a high pressure to a pure hydrogen reservoir via this process.

In the JTEC, using hydrogen as the ionizable gas (i.e., the working fluid), the electrical potential due to a hydrogen pressure differential across the PCM 120 is proportional to the natural logarithm of the pressure ratio, and can be calculated using the Nernst equation:

$$V_{OC} = \frac{RT}{2F}\ln(P_H/P_L), \qquad \text{Equation 1}$$

where $V_{OC}$ is open circuit voltage, R is the universal gas constant, T is the cell temperature, F is Faraday's constant, $P_H$ is the pressure on the high pressure side, $P_L$ is the pressure on the low pressure side, and $P_H/P_L$ is the pressure ratio. E.g., *Fuel Cell Handbook*, J. H. Hirschenhofer et al., 4$^{th}$ Edition, p. 2-5 (1999).

Figure 2:
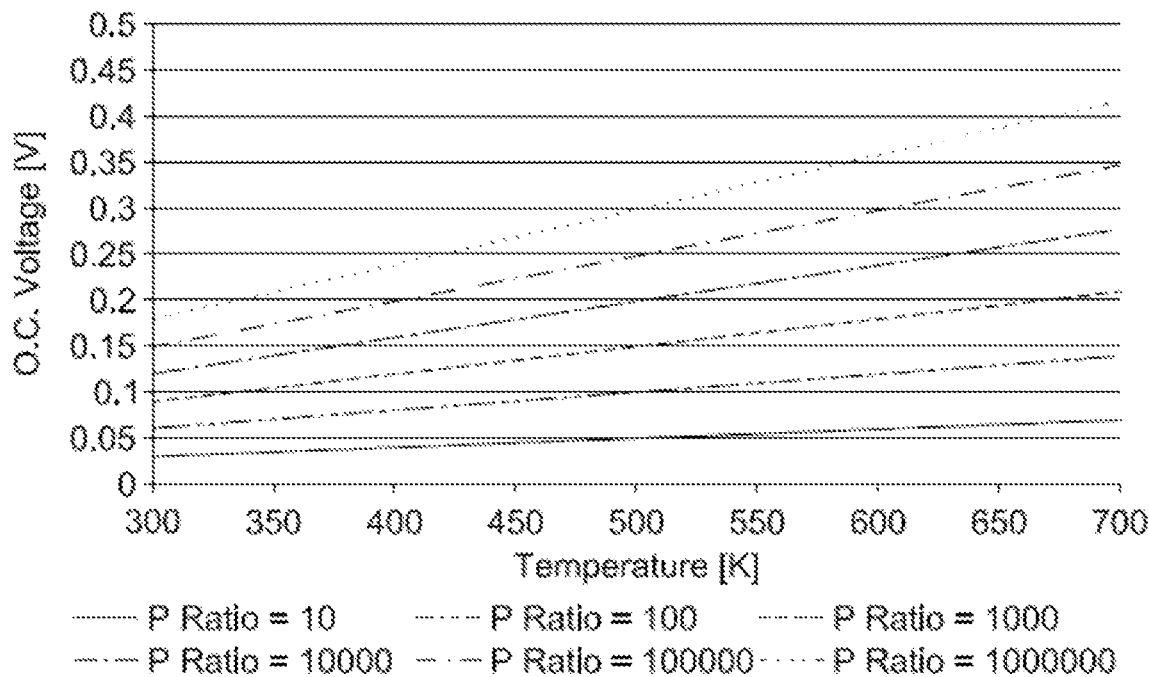
FIG. 2 is a plot of Nernst voltage versus temperature for several pressure ratios.

The voltage generated by the first MEA stack is thus given by the Nernst equation. The voltage is linear with respect to temperature and is a logarithmic function of the pressure ratio. FIG. 2 is a plot of the Nernst equation for hydrogen and shows the voltage vs. temperature relationship for several pressure ratios. For example, referring to FIG. 2, at a pressure ratio of 10,000, when the temperature is relatively high, the voltage is similarly relatively high and when the temperature is relatively low, the voltage is similarly relatively low.

The working fluid in the JTEC is compressed in the low temperature electrochemical cell 100 by supplying current at a voltage that is sufficient to overcome the Nernst potential of the low temperature cell 100, thereby driving hydrogen from the low pressure side of the membrane 120 to the high pressure side. On the other hand, the working fluid is expanded in the high temperature electrochemical cell 110 as current (power) is extracted under the Nernst potential of the high temperature cell 110. Electrical current flow is generated as hydrogen expands from the high pressure side of the membrane 120 to the low pressure side. As in any thermodynamic engine employing a working fluid and consistent with the nature of compressible gas, in the JTEC, a greater amount of work (electricity) is extracted during high temperature expansion than the work (electricity) input required for the low temperature compression. The difference in heat energy input to the engine to maintain constant temperature during high temperature expansion versus the heat energy removed to maintain constant temperature during low temperature compression is provided as the difference in electrical energy output by the high temperature expansion process versus that consumed by the low temperature compression process.

Consistent with the Nernst equation, the high temperature cell 110 will have a higher voltage than the low temperature cell. Since the current (I) is the same through both cells 100, 110, the voltage differential means that the power generated through the expansion of hydrogen in the high temperature cell 110 is higher than that of the low temperature cell 100. The power output by the high temperature cell ($V_{HT}$*I) is sufficient to drive the compression process in the low temperature cell 100 ($V_{LT}$*I) as well as supply net power output to an external load (($V_{HT}$*I)−($V_{LT}$*I)). This voltage differential provides the basis for the JTEC engine.

Figure 3:
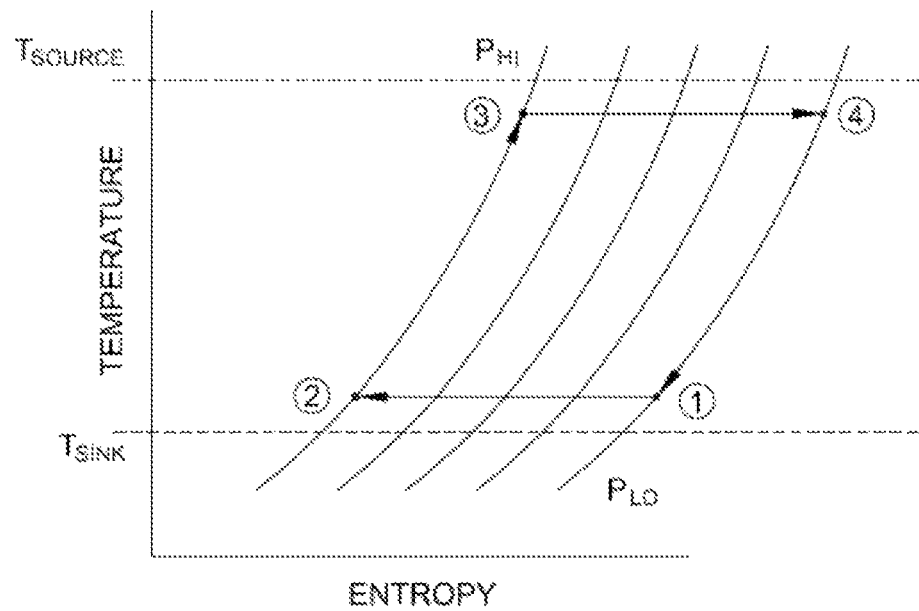
FIG. 3 is a diagram of the Ericsson thermodynamic cycle.

The JTEC is an all solid-state engine that operates on the more efficient Ericsson cycle, which is equivalent to the Carnot cycle. Referring to FIG. 3, there is shown the ideal temperature entropy diagram for the Ericsson engine cycle of the JTEC. Reference numerals "1" through "4" in FIGS. 1 and 3 represent different thermodynamic states. The thermodynamic states 1 through 4 are identical at the respective identified points in FIGS. 1 and 3. As shown in FIG. 1, beginning at the low-temperature, low-pressure state 1, electrical energy Win is supplied to the low-temperature (first) MEA stack in order to pump hydrogen from the low-temperature, low-pressure state 1 to the low-temperature, high-pressure state 2. The temperature of the hydrogen is maintained nearly constant by removing heat $Q_L$ from the PCM 120 during the compression process. The membrane 120 is relatively thin (i.e., less than 10 μm thick), and thus will not support a significant temperature gradient, so the near isothermal assumption for the process is valid, provided adequate heat is transferred from the membrane 120 through its substrate.

From state 2, the hydrogen passes through the recuperative, counterflow heat exchanger 114 and is heated under approximately constant pressure to the high-temperature state 3. The heat needed to elevate the temperature of the hydrogen from state 2 to 3 is transferred from hydrogen flowing in the opposite direction through the heat exchanger 114. At the high-temperature, high-pressure state 3, electrical power is generated as hydrogen expands across the second MEA stack from the high-pressure, high-temperature state 3 to the low-pressure, high-temperature state 4. Heat $Q_H$ is supplied to the thin film membrane 120 to maintain a near constant temperature as the hydrogen expands from high-pressure state 3 to low-pressure state 4. From state 4 to state 1, the hydrogen flows through the recuperative heat exchanger 114, wherein its temperature is lowered by heat transfer to hydrogen passing from state 2 to 3. The hydrogen is pumped by the low-temperature MEA stack from state 1 back to high-pressure state 2 as the cycle continues.

Figure 4:
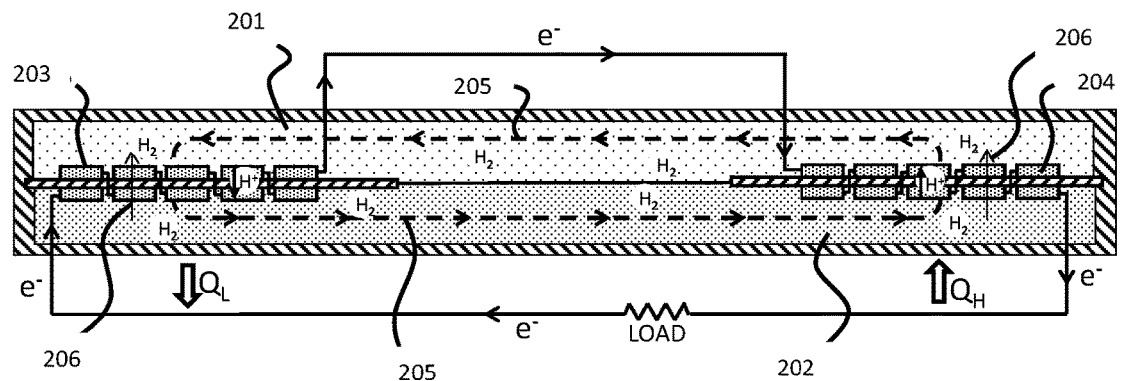
FIG. 4 is a schematic of the operating configuration of a conventional Johnson Thermo-Electrochemical Converter.

However, PCMs are not perfect barriers to the working fluid, namely hydrogen, and have known diffusion rates, which means that the hydrogen pressure differential, upon which operation of the JTEC engine depends as described above, will neutralize itself by molecular diffusion through the PCMs. More particularly, FIG. 4 depicts this hydrogen diffusion in the prior art operation of the JTEC with a high temperature MEA stack 204 coupled to a heat source $Q_H$ and a low temperature MEA stack 203 coupled to a heat sink $Q_L$. The two MEA stacks 203 and 204 have the same number of cells (i.e., MEAs) and the cells are connected in series, thus ensuring that the net current flow in each MEA stack 203, 204 is the same. The result is that hydrogen circulation in each MEA stack 203, 204 is the same and is therefore continuous. Hydrogen circulates within the converter as indicated by arrows 205 between the two MEA stacks 203, 204, as it is conducted back and forth between the low pressure conduit 201 and the high pressure conduit 202. Molecular hydrogen diffusion through the membranes is represented by arrows 206. Nominally, however, over time, the pressure differential will decay because of the natural diffusion under the applied pressure.

Also, operation of the conventional JTEC may be initiated after a period of dormancy during which the pressure differential may have decayed due to molecular hydrogen diffusion. The present improvement maintains the operating pressure differential across the membrane to compensate for the diffusion loss or decay.

Figure 5:
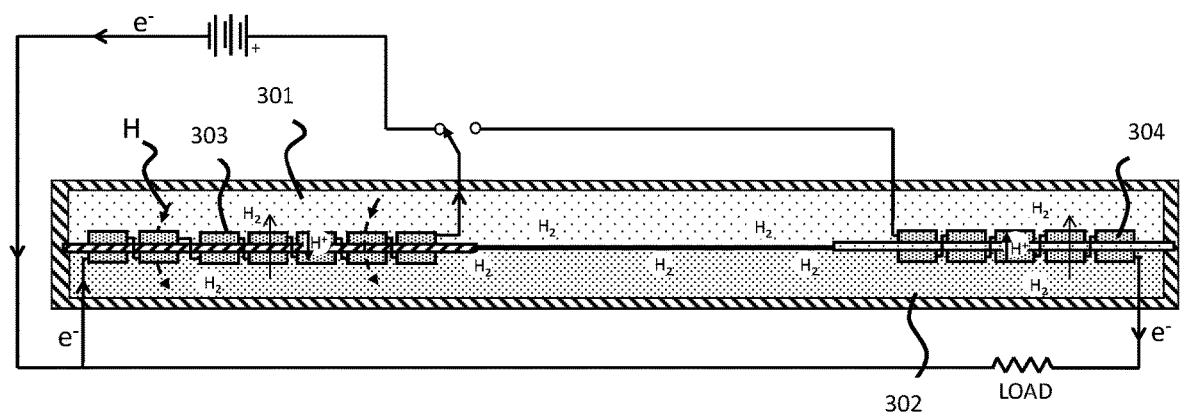
FIG. 5 is an operation start up diagram of the engine, in accordance with an embodiment of the present invention, with an external power source and a control switch showing hydrogen being pumped to the high pressure side of the engine.

Referring to FIG. 5, there is shown the start-up operation of an improved JTEC system including a low temperature array or stack 303 of a first plurality of MEA cells electrically connected in series and a high temperature array or stack 304 of a second plurality of MEA cells electrically connected in series. In this example, the electrodes of the MEA cells share a common membrane. FIG. 5 illustrates the simple process of initially applying power to one of the MEA stacks to drive hydrogen H from low pressure side 301 to high pressure side 302 in order to equalize the pressure across the membranes. Once the pressure differential is established, the converter can be switched to its normal operating configuration with the MEA cells connected in series with the external load. Power can then be generated by applying heat to the high temperature MEA stack 304 and removing heat from low temperature MEA stack 303.

Figure 6:
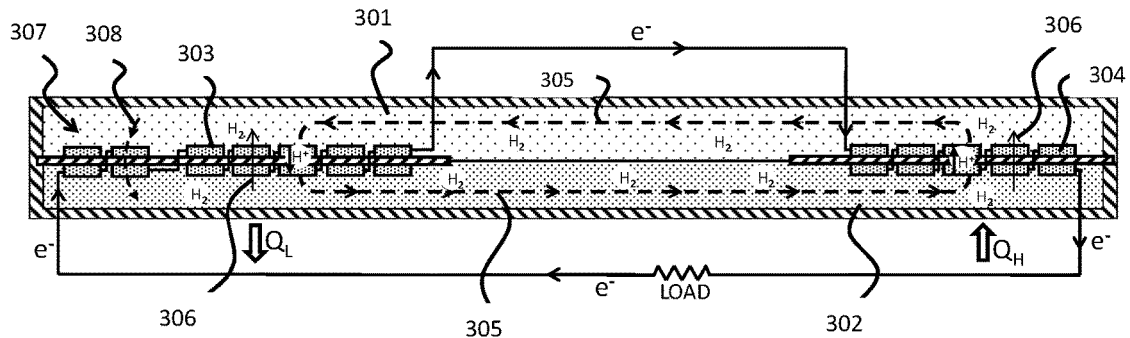
FIG. 6 is a schematic of the operating configuration of the engine with additional MEA cells on the low temperature side to compensate for loss of pressure differential due to hydrogen diffusion across the membranes, in accordance with an embodiment of the present invention.

More particularly, referring to FIG. 6, the improved JTEC includes additional MEA cells 307 in the low temperature MEA stack 303. Thus, the low temperature MEA stack 303 includes more MEA cells than the high temperature MEA stack 304. The supplemental MEA cells 307 are connected in series with the rest of the MEA cells in the low temperature MEA stack 303, such that the net voltage of the low temperature MEA stack 303 is slightly higher than in a conventional JTEC, but is still less than the net voltage of the high temperature MEA stack 304. The series connection of the MEA cells in the low temperature MEA stack 303 ensures that the current flow through each cell in the stack 303 remains the same. Hydrogen circulates within the converter as indicated by arrows 305 between the two MEA stacks 303, 304, as it is conducted back and forth between the low pressure conduit 301 and the high pressure conduit 302. However, the additional cells 307 in the low temperature MEA stack 303 cause additional hydrogen 308 to be pumped from the low pressure side 301 to the high pressure side 302 of the converter. Pumping of the additional hydrogen through the converter may be effected by the MEA stacks or arrays 303, 304 themselves, or by a controller (shown in FIG. 7). Operation under this condition means that hydrogen diffusion 306 is compensated for by the additional pumped hydrogen 308.

Figure 7:
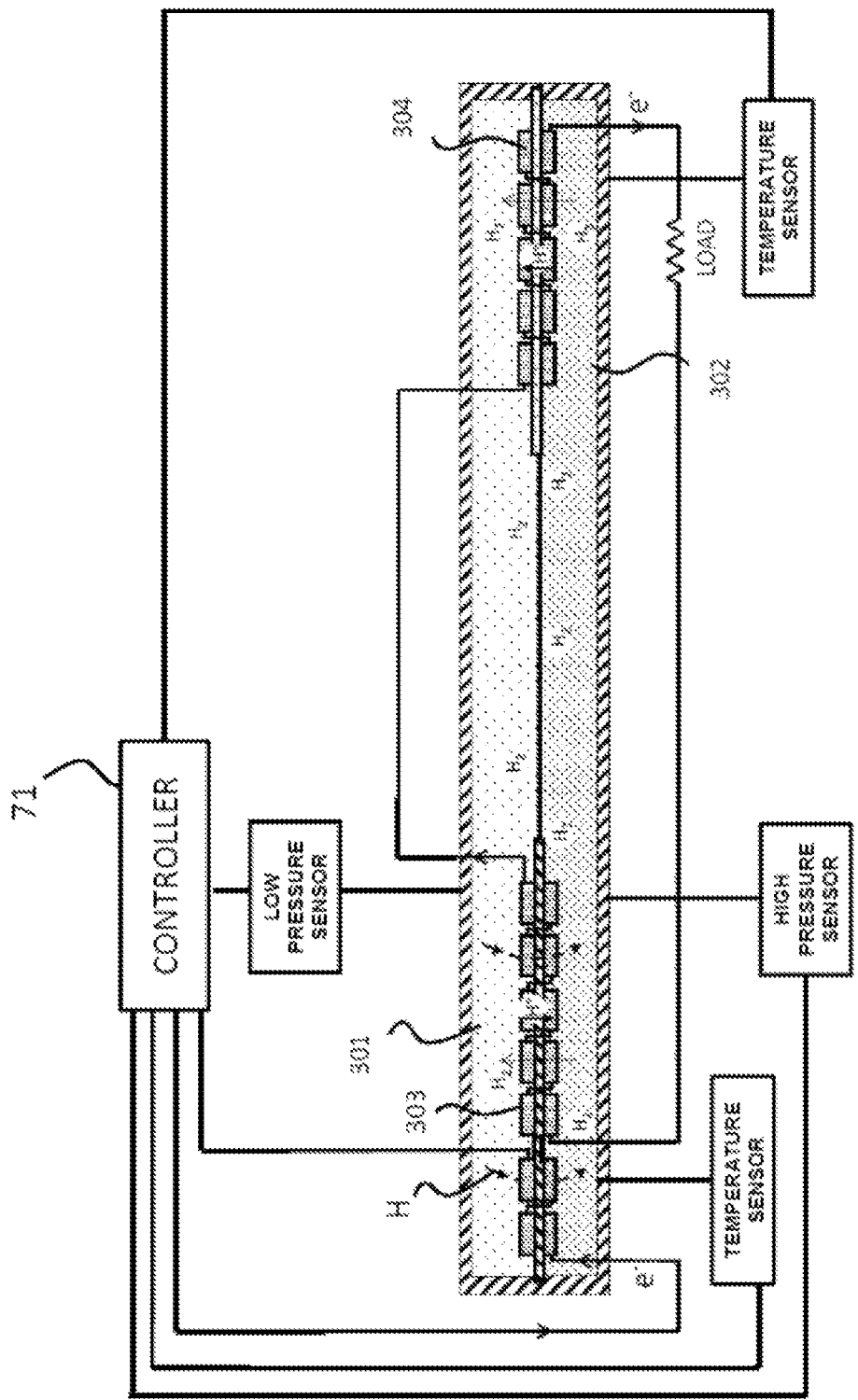
FIG. 7 is a schematic of the operating configuration of the engine with MEA cell arrays and a controller to compensate for loss of pressure differential due to hydrogen diffusion across the membranes, in accordance with an embodiment of the present invention.

FIG. 7 is a diagram showing a controller for monitoring the pressures on the high and low pressure sides of the JTEC and the temperatures at the high and low temperature ends of the JTEC. A controller 71 uses the pressure measurements to determine the extent of pressure differential diffusion loss. The controller 71 is coupled to the membrane electrode assembly cells within the JTEC and actuates the cells to pump additional hydrogen to the high pressure side when the pressure differential drops below a predetermined value. The controller 71 may optionally monitor cell voltage and temperature and calculate the pressure differential using the Nernst equation.

Figure 8:
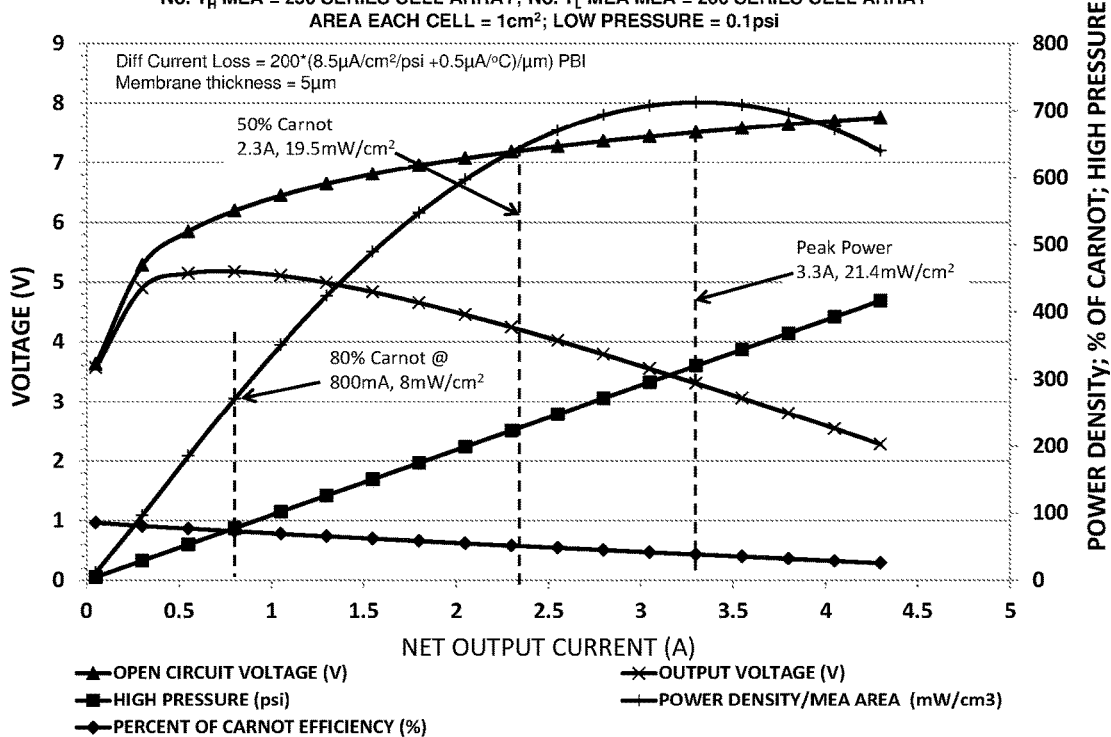
FIG. 8 is a diagram representing the operating configuration of the engine at a low grade temperature of 150° C. and including additional MEA cells on the low pressure side to compensate for loss of pressure differential due to hydrogen diffusion across the membranes, in accordance with an embodiment of the present invention.

FIG. 8 is a diagram representing the operating configuration of the engine of the present invention at a low grade temperature of 150° C. The results of FIG. 8 demonstrate the additional pumped hydrogen 308 raises the pressure differential until equilibrium (i.e., equalization) is achieved, such that the pressure differential is high enough to force hydrogen diffusion 306 to a level that is equal to the pumped flow of hydrogen 308. In this example, the high temperature MEA stack 304 is made up of 250 cells, whereas the low temperature MEA stack is made up of 260 cells. Because of the series connection of the cells, as the load increases its current draw, the imbalanced rate at which hydrogen is pumped to the high pressure side 302 also increases. The increased pump rate of the hydrogen 308 drives the pressure differential higher, until the back diffusion rate 306 of the hydrogen against the pressure differential becomes high enough to achieve equilibrium with the pump rate 308. The diagram of FIG. 8 shows the increase in pressure with an increase in output current.

Similar to conventional fuel cells, the JTEC operates under maximum efficiency levels when operating at lowest power levels. Referring to FIG. 8, the JTEC achieves a peak power density of 700 mWh/cm$^3$ at a high side pressure of 319 psi and 35% of Carnot. At 80% of Carnot, the operating pressure is 72 psi and the power density is 270 mW/cm$^3$. Also, the open circuit voltage increases as the current draw increases due to the increase in the pressure ratio, as described above. However, the output voltage decreases with increasing current draw, because the higher current causes increased voltage drop across the internal resistance of the MEA cells.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A thermo-electrochemical converter comprising a first membrane electrode assembly array and a second membrane electrode assembly array, each of the first and second membrane electrode assembly (MEA) arrays comprising:
   a plurality of porous electrodes;
   a working fluid;
   a plurality of ion or proton conductive membranes, the porous electrodes being arranged in an alternating sequence with the membranes;
   a plurality of conduits containing the working fluid, at least one of the conduits being a high pressure conduit containing the working fluid at a first pressure and at least another one of the conduits being a low pressure conduit containing the working fluid at a second pressure which is lower than the first pressure,
   wherein the number of porous electrodes and membranes of the first MEA array is greater than the number of porous electrodes and membranes of the second MEA array,
   wherein a first porous electrode of any sequential pair of the porous electrodes in each MEA array is coupled to the low pressure conduit for low pressure working fluid flow therethrough and a second porous electrode of the sequential pair of the porous electrodes is coupled to the high pressure conduit for high pressure working fluid flow therethrough, such that each of the membranes is subjected to a pressure differential between the pair of porous electrodes,
   wherein, in a first mode of operation of the converter, the working fluid is configured to circulate in the plurality of conduits by flowing through the porous electrodes and membranes of the first MEA array in a first direction from a low pressure side to a high pressure side of the converter and through the porous electrodes and membranes of the second MEA array in a second direction opposite to the first direction from the high pressure side to the low pressure side of the converter, and
   wherein the greater number of porous electrodes and membranes of the first MEA array causes an additional amount of the working fluid to be pumped from the low pressure side to the high pressure side of the converter, in order to compensate for a loss of the pressure differential resulting from molecular diffusion of the working fluid through the membranes.

2. The thermo-electrochemical converter according to claim 1, wherein the porous electrodes of the first MEA array are electrically connected in series with each other so as to produce a higher MEA voltage.

3. The thermo-electrochemical converter according to claim 1, wherein the working fluid is selected from a group consisting of oxygen, hydrogen and sodium.

4. The thermo-electrochemical converter according to claim 3, wherein the working fluid is hydrogen.

5. The thermo-electrochemical converter according to claim 1, further comprising heat exchanger means for transferring heat from the high pressure conduit to the low pressure conduit.

6. The thermo-electrochemical converter according to claim 1, further comprising a controller which actuates the MEA arrays to pump the additional hydrogen to the high pressure side.

* * * * *